United States Patent [19]

Splan

[11] 4,212,260
[45] Jul. 15, 1980

[54] AUTOMOBILE HEADLIGHT REMINDER DEVICE

[76] Inventor: Robert Splan, 900 E. Wilmette, Palatine, Ill. 60067

[21] Appl. No.: 53,067

[22] Filed: Jun. 28, 1979

[51] Int. Cl.² .......................... B60Q 9/00; G09B 7/18
[52] U.S. Cl. ................................... 116/28 R; 40/331; 40/593; 116/306
[58] Field of Search ............. 116/28 R, 306; 40/10 A, 40/10 B, 322, 593

[56] References Cited

U.S. PATENT DOCUMENTS

| | | | |
|---|---|---|---|
| 1,276,735 | 8/1918 | Devney | 40/331 |
| 1,633,724 | 6/1927 | Burris | 40/10 A |
| 3,237,330 | 3/1966 | Dinstbir | 116/28 R X |
| 3,758,974 | 9/1973 | Malmer | 40/322 |

*Primary Examiner*—Daniel M. Yasich

*Attorney, Agent, or Firm*—Trexler, Wolters, Bushnell & Fosse, Ltd.

[57] ABSTRACT

An apparatus for reminding a driver to turn off automobile headlights before locking the automobile door, comprises a sheath member defining an enclosure for concealing an interior automobile door lock actuating post and removably mountable thereover. A cooperating bracket member is mounted to the sheath member and movable relative thereto for engaging an automobile window slot adjacent to the door lock actuating post. Cooperatively, the bracket acts to maintain the sheath member in position so as to conceal the door lock actuating post. Consequently, the apparatus must be physically removed from the door locking post by the driver in order to actuate the post to its locking position, thereby reminding the driver to turn off the automobile headlights before locking the door.

7 Claims, 7 Drawing Figures

AUTOMOBILE HEADLIGHT REMINDER DEVICE

BACKGROUND OF THE INVENTION

This invention is directed to apparatus for reminding one to switch off the headlights of an automobile before locking the automobile door.

As is well known, forgetting to turn off one's automobile headlights can result in considerable personal inconvenience and frustration. The situations in which one may forget to switch off one's automobile headlights are indeed many and varied. At a minimum, a dead battery may result, thereby requiring a battery jump to restart the engine. In the extreme case, the battery may in fact be discharged to such a point that replacement is required, a great inconvenience and expense.

Solutions heretofore proposed for this problem have tended to be complex, expensive and potentially troublesome in themselves. For example, some automobile manufacturers provide optional electrical or electronic apparatus for deenergizing headlights automatically after a given time period, once the ignition has been turned off. Additionally, "buzzer" signaling devices have been proposed, involving a number of electrical parts and wiring. These are also relatively expensive as well as being time consuming to install. Moreover, either of the foregoing devices may fail to operate because of faulty parts or improper installation, or may fail in service from any number of causes.

Accordingly, the present invention provides a relatively simple and reliable, non-electrical apparatus for assuring a convenient reminder to the driver to switch off the headlights before locking the automobile door preparatory to departing the vehicle.

OBJECTS AND SUMMARY OF THE INVENTION

It is a general object of this invention to provide a new and improved apparatus for reminding a driver to deenergize the headlights of an automobile door preparatory to leaving the car.

Briefly, apparatus in accordance with the invention comprises an enclosure-defining sheath member for selectively concealing a door lock actuator post by being removably mountable thereover. A bracket member is coupled to said sheath member to be movable relative thereto for engaging an automobile window slot adjacent the interior door lock actuating post for maintaining the sheath member in position for concealing the post. Accordingly, the apparatus must be removed from the door lock actuating post in order to actuate the post to its locking position, thereby reminding the driver to turn off the headlights before locking the door.

BRIEF DESCRIPTION OF THE DRAWINGS

The foregoing as well as other objects, features and advantages of the invention will be more readily appreciated upon consideration of the following detailed decription of the illustrated embodiment, together with the accompanying drawings wherein.

DETAILED DESCRIPTION OF THE ILLUSTRATED EMBODIMENT

Figure 1:
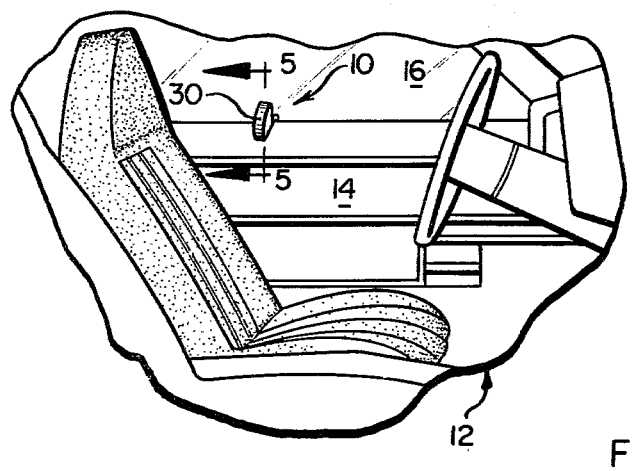
FIG. 1 is a partially cut-away view of a typical automobile interior, showing apparatus of the invention mounted to conceal a door lock actuator post.
Figure 5:
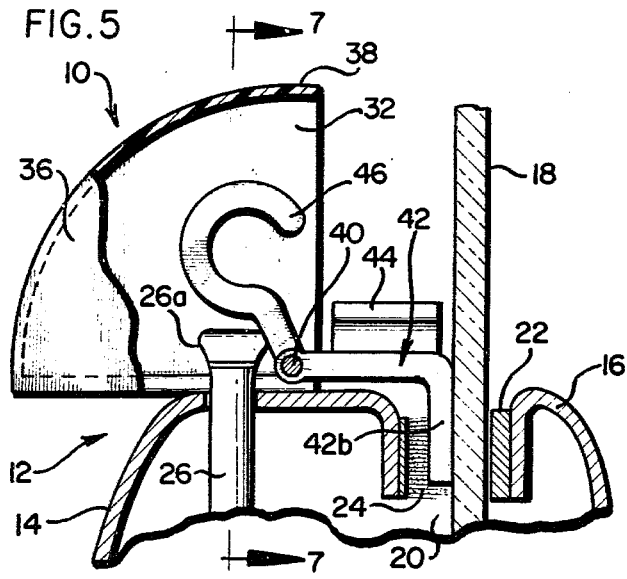
FIG. 5 is an enlarged view, partially in section, of apparatus according to the invention, taken generally along the lines 5—5 of FIG. 1.

Referring now to the drawings, and initially to FIGS. 1 and 5, apparatus according to the invention, designated generally by the reference numeral 10, is illustrated in conjunction with the interior of a typical automobile, designated by the numeral 12. Generally speaking, the automobile includes an interior door panel 14, an exterior door panel 16 and a window 18 mounted generally in a window well or slot 20 formed between the door panels. Conventionally, door panels 14 and 16 include weatherseal members 22 and 24, for preventing the ingress of moisture, dirt or the like, while allowing vertical reciprocation of the window for opening and closing the corresponding opening. Also, in accordance with conventional practice, a door lock actuating button or post 26 is mounted in the interior door panel 14, and generally vertically actuatable (as is best viewed in FIGS. 5, 6 and 7) for alternatively locking and unlocking the door.

Figure 2:
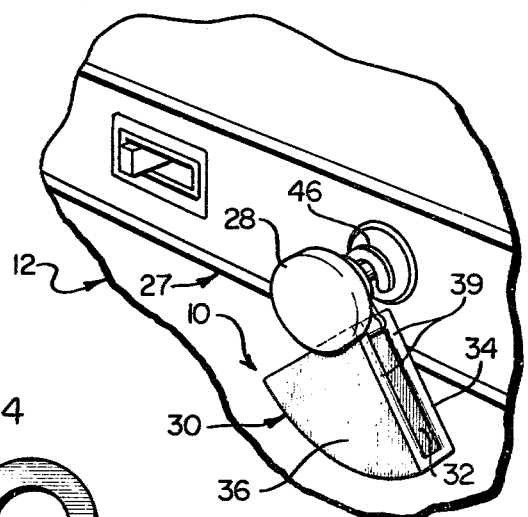
FIG. 2 is a cut-away view of a portion of the invention mounted, when not in use on the door lock actuating post, on a headlight control knob.
Figure 3:
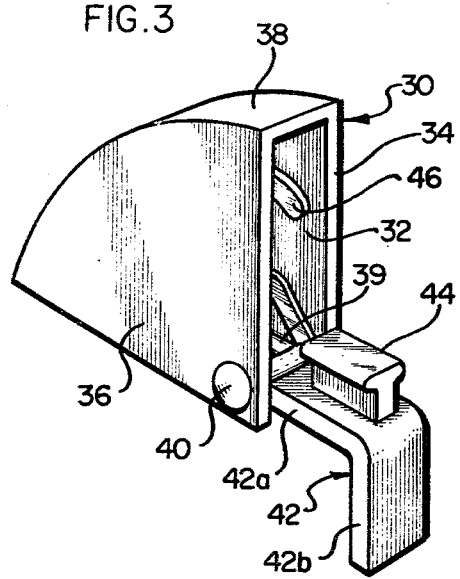
FIG. 3 is an enlarged perspective view of apparatus according to the invention.

Referring briefly to FIG. 2, the automobile interior is also seen to include a dashboard designated generally by reference numeral 27 which includes a headlight control knob 28.

Figure 7:
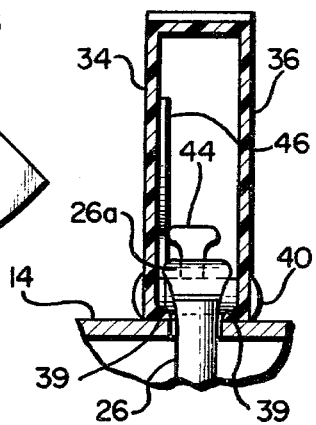
Figure 6:
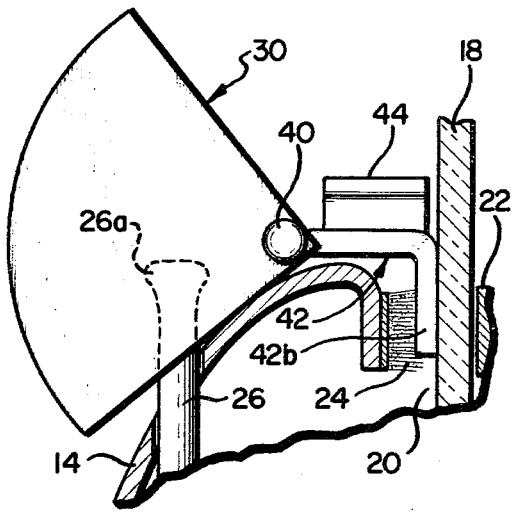
FIG. 6 is a side elevational view, similar to FIG. 5, showing the invention in conjunction with a somewhat different automobile door configuration; and, FIG. 7 is a view, partially in section, taken generally along the lines 7—7 of FIG. 5.

Attention is next directed to the apparatus 10 of the invention, which will be seen to include a substantially hollow, generally sector-shaped body or sheath member designated generally by the reference numeral 30. In the illustrated embodiment, this sheath member 30 defines an enclosure 32 of sufficient size for concealing the door lock actuator post 26, when mounted thereover, as is best seen in FIGS. 5, 6 and 7. In the illustrated embodiment, this sheath member resembles a "wedge" wich comprises a quarter-sector of a right cylinder whose height is substantially smaller than its radius. Stated another way, the sheath member 30 comprises a pair of identical parallel walls 34, 36, each of which subtends a 90° arc of a circle, and a curvilinear wall 38 joining the walls 34 and 36 along the outer edges thereof.

A shaft or journal member 40 is rigidly mounted, perpendicularly joining the walls 34 and 36, at respective regions thereof closest the centers of radius of the arcs subtended thereby. An L-shaped bracket member 42 has its one leg 42a rotatably journalled about the shaft or journal 40. This bracket member 42 also includes a protruding graspable portion 44, which in the illustrated embodiment is generally T-shaped in cross-section. Advantageously, the bracket member 42 may be rotated and concealed interiorly of the enclosure 32 defined by the sheath member 30, when not in use. Additionally, the thickness of bracket member 42 and more particularly of the remaining leg 42b thereof is chosen so as to permit removable wedging of leg 42b between the window 18 and the weatherseal member 24, as is best seen in FIGS. 5 and 6. Accordingly, the sheath member 30 may readily be rotated, once the bracket 42 is thus wedged into position, for concealable mounting over the door actuating post 26.

To further facilitate the desired positioning of the sheath 30 for concealing post 26, the walls 34 and 36 are preferably provided with a pair of like, inwardly facing, pursed flange or ridge portions 39—39. Cooperatively, the walls 34 and 36 are capable of some degree of elastic or non-deformable flexion, thereby permitting a sufficient degree of separation of flanges 39—39 for clearing the enlarged head portion 26a of post 26. Thereafter, walls 34, 36 elastically return flanges 39—39 snugly about the body of post 26, as is seen best in FIG. 7, thereby encouraging retention of the sheath 30 in its preferred position: concealing the post 26. Advantageously, as will be seen from a comparison of FIGS. 5 and 6, the apparatus of the invention, configured as heretofore described, functions remarkably well with automobile interior door panels and locking posts of varying dimensions, configurations and relative placements.

Figure 4:
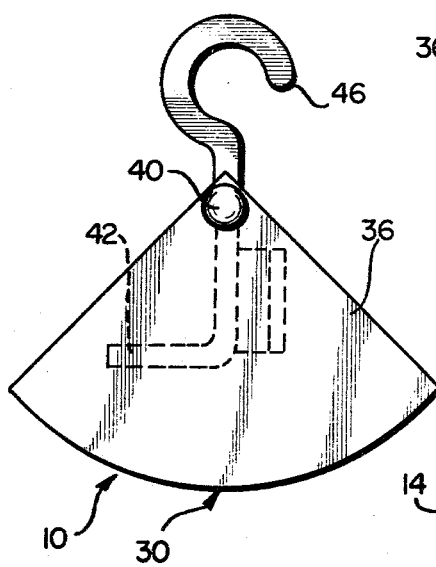
FIG. 4 is a side elevation of apparatus according to the invention.

In the illustrated embodiment, the apparatus 10 of the invention also includes a hanger member or hook 46 rotatably journalled upon the shaft 40. This hanger member or hook 46 is relatively thin in cross-section as compared to bracket 42, so as to be mountable on the shaft 40 axially adjacent thereto. Moreover, hanger member or hook 46 is of suitably small overall size so as to be selectively rotatable for concealment inside enclosure 32, when not in use. The hanger or hook 46 is utilized for hanging the apparatus 10 on the headlight control knob 28 when not in use as described above, as is best seen in FIGS. 2 and 4.

In use, then, the apparatus of the invention, although simple, is surprisingly effective as a reminder to the driver to switch off the automobile headlights before locking the door. When the apparatus 10 is mounted to the door locking post 26, as is best seen in FIGS. 1 and 5 or 6, the driver must remove the apparatus 10 in order to actuate the post 26 for locking the door. This necessary act has the inevitable effect of reminding the driver to turn off the headlights, if he has not already done so. Following removal of the apparatus 10, the hanger member or hook 46 may be rotated outwardly of the sheath 30 for suspending the apparatus 10 from the headlight control knob 28. Accordingly, when the headlight knob 28 is next actuated by the driver for turning on the headlights, he will again note the presence of apparatus 10, and reposition it over the post 26 to serve once again as a reminder to turn off the headlights before locking the door and leaving the automobile.

While a preferred embodiment of the invention has been illustrated and described herein, the invention is not limited thereto. On the contrary, various alternatives, changes and modifications may become apparent to those skilled in the art upon reading the foregoing descriptions. The invention includes any such changes, alternatives or modifications, insofar as they fall within the spirit and scope of the appended claims.

The invention is claimed as follows:

1. Apparatus for reminding a driver to turn off automobile headlights before locking an automobile door, comprising: a sheath member defining an enclosure for concealing an interior automobile door lock actuating post and removably mountable thereover, and a bracket member coupled to said sheath member and movable relative thereto for engaging an automobile window slot adjacent said door lock actuating post for maintaining said sheath member in a position for concealing said door lock actuating post, whereby said apparatus must be removed by the driver from the door lock actuating post in order to actuate the post to its locking position, thereby reminding the driver to turn off the automobile headlights before locking the door.

2. Apparatus according to claim 1 wherein said sheath member comprises a hollow bodied member defining a sector of a right cylinder of smaller height than radius, and being open at its radial sides.

3. Apparatus according to claim 2 wherein said bracket member comprises a substantially L-shaped member, rotatably mounted substantially adjacent the apex of said sector defined by said sheath, and positioned relative to said sheath member so as to be selectively rotatable for concealment inside of said sheath member.

4. Apparatus according to claim 1 or claim 3 further including a hanging member mounted to said sheath member and movable relative thereto for selectively hanging said apparatus on an automobile headlight control knob, when removed from the door lock actuating post.

5. Apparatus according to claim 4 and including a shaft member bridging the enclosure defined by the sheath member substantially adjacent its apical portion, and rotatably carrying said bracket member, and wherein said hanging member is rotatably mounted on said shaft member in side-by-side relation with said bracket member so as to be selectively rotatable for concealment with the sheath member.

6. Apparatus according to claim 1 or claim 3 wherein said bracket member includes a protruding grasping portion for controlling movement of said bracket member.

7. Apparatus according to claim 1 or claim 3 wherein said sheath member further defines a pair of parallel, sector-shaped side walls, each carrying at a peripheral portion, one of a pair of like, inwardly facing flange portions for snappingly engaging over a head portion of said door lock actuating post and for facilitating the positioning of said sheath member for concealing said door lock actuating post.

* * * * *